P. SEJOURNET.
ELECTRODE FOR ELECTRIC FURNACES.
APPLICATION FILED DEC. 9, 1918.

1,315,992.

Patented Sept. 16, 1919.
2 SHEETS—SHEET 1.

Inventor:
Paul Sejournet,
By Attorneys,

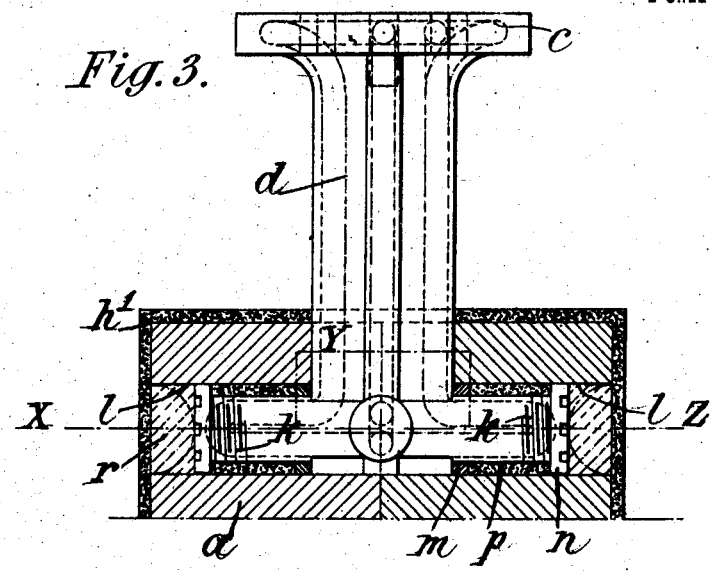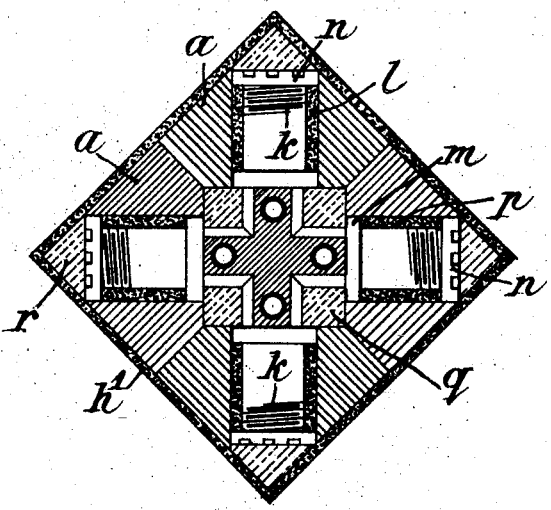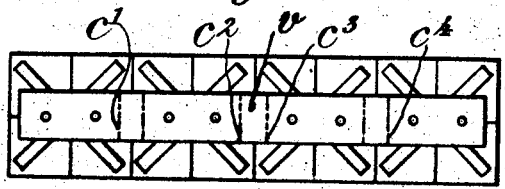

UNITED STATES PATENT OFFICE.

PAUL SEJOURNET, OF PARIS, FRANCE, ASSIGNOR TO SOCIETE ELECTRO METALLURGIQUE FRANCAISE, OF FROGES, ISERE, FRANCE.

ELECTRODE FOR ELECTRIC FURNACES.

1,315,992.  Specification of Letters Patent.  Patented Sept. 16, 1919.

Application filed December 9, 1918. Serial No. 265,916.

*To all whom it may concern:*

Be it known that I, PAUL SEJOURNET, a subject of the Republic of France, of 109 Boulevard Haussmann, Paris, France, have invented certain new and useful Improvements Relating to Electrodes for Electric Furnaces, of which the following is a specification.

The present invention consists in a method for connecting the electrodes of electric furnaces for electrometallurgical or electrochemical operations and is more particularly applicable to the case in which each electrode consists of several conducting members.

The object of this method of connection is to be able to lead the current into a mobile central member which mechanically connects the several component parts of the electrode and (*a*) insures a suitable distribution of the electric current in the different parts of the members constituting the electrode, (*b*) utilizes the greatest possible length of electrode.

These results are obtained by providing the lower end of the leading in member with extensions equal in number to that of the several components of the electrode each extension engaging in a recess provided in one of the components up to the points farthest from the center of the electrode, the extension being made solid with the component of the electrode by a suitable conducting agglomerate.

The accompanying drawings show by way of example means for carrying out the invention in the case of an electrode in four parts.

Fig. 3 is an elevation partly in section and Fig. 4 a section on the line X—Y—Z of Fig. 3 of a modified construction.

Fig. 5 shows the grouping of several electrodes.

Figure 1:
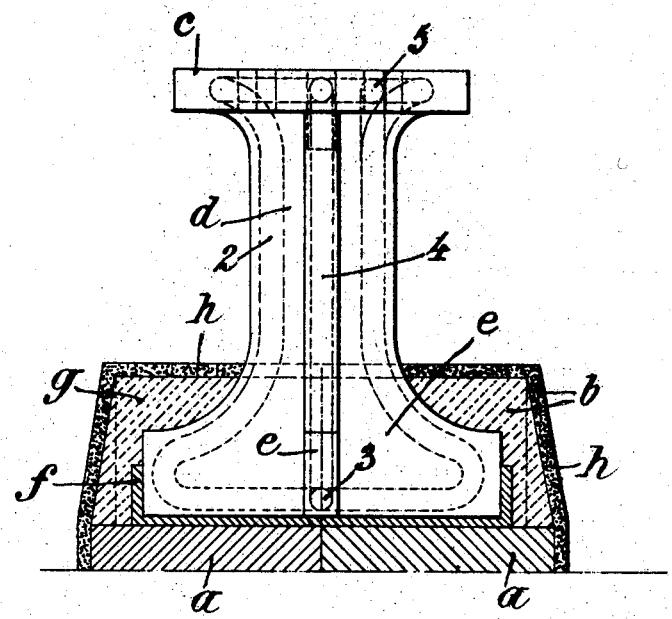
Figure 1 is a vertical section of the electrode by a diagonal plane.
Figure 2:
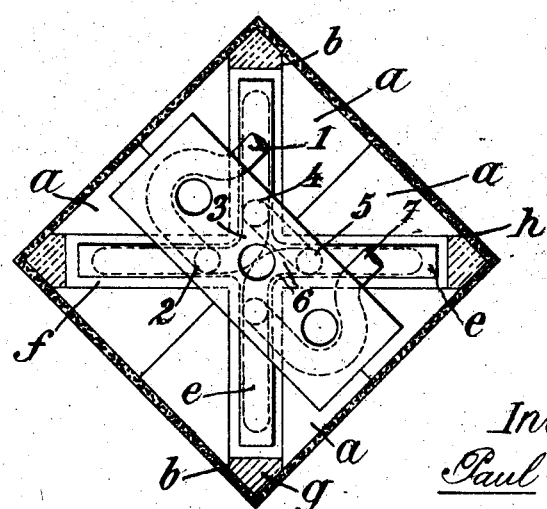
Fig. 2 is a plan view.

In Figs. 1 and 2 *a* represents the upper ends of the carbons which constitute the electrode. They are each provided with a diagonal groove or recess *b*.

The current enters by a plate *c* joined to the carbons *a* by a stem *d* of cruciform section connected with flexible conductors which allow the parts to be raised and lowered together.

At the lower end of the stem *d* are four extensions *e* engaging respectively in the grooves *b* of the four carbons. The width of these grooves is sensibly greater than that of the extensions, an intimate contact between the parts being insured by means of a joint made by running in metal *f* and by a sealing conductor *g*. Finally the whole is protected by a covering *h* of refractory material.

The member *d* comprises besides means *i* for clamping the cables and for fixing the suspension hook of the electrode a system of circulating water for cooling. In the example shown this water enters the plate *c* at 1, descends in the left side by the passage 2, circulates in the corresponding extension, passes at 3 into the rear side, ascends at 4, passes to the right at 5, descends, is led at 6 into the forward extension, ascends, and finally is discharged at 7.

In the modification represented in Figs. 3 and 4 the extensions *k* of the member *d* are cylindrical and their outer ends are screw threaded.

At the upper portion of each of the carbons there is a hole *l* of a diameter greater than that of the parts *k* and the portion toward the center, preferably forms a recess which allows a joint of carbon paste *q* to be easily made. The carbons are introduced separately in the extensions.

The contact between the cylindrical extensions and the carbons is insured by a kind of gland formed of a washer *m*, of a granular conducting composition *p* and of a screw nut *n* by which it is compressed; the nut and the washer *m* are adjusted in the holes of the carbons. The free space on the exterior is filled with a carbon paste at *r* and a covering of refractory material *h'* is arranged as in the former case. A water circulation as described above completes the arrangement.

It is to be remarked that the connecting piece with sealing paste is suitable for electrodes which are mono block round or square, as well as those composed of four parts. The distribution of current is obtained with this member along the two diagonals of the mono block electrode the density of the current being as homogeneous as the nature of the current employed will allow, an advantage which is particularly appreciable with alternating currents, and in case of longitudinal fissures susceptible of localizing the passage of the current, there is no risk of abnormal densities in certain parts of the electrodes which with strictly axial connections often lead to the fracture of the electrode.

Also both constructions of the connecting members allow of a convenient arrangement of several electrodes connected together for very great current strengths.

In Fig. 5 is shown an arrangement of several compound electrodes connected on the same principle.

All the leading in members have their upper plates at the same height and the compound electrodes $c^1$, $c^2$, $c^3$, $c^4$ are assembled on a bridge $v$.

I claim—

1. Means for distributing the current in electrodes of electric furnaces comprising a member for leading in the current having extensions adapted to engage in diagonally arranged recesses provided at the upper ends of the electrodes and a conducting composition sealing said extensions in position.

2. Means according to claim 1, and an envelop refractory material, in which the electrodes are surrounded.

3. Means according to claim 1, and means for providing a water circulation in the extensions of said member.

4. Means according to claim 1, the extensions of the member for leading in the current being cylindrical and engaging in cylindrical recesses provided in the heads of the electrodes, a granular composition surrounding the extensions and nuts threaded on to the outer ends of the extensions for compressing said granular composition, substantially as described.

5. Means according to claim 1, and means for providing a water circulation in each of the extensions of said member.

6. Means for distributing the current in electrodes of electric furnaces, comprising a plurality of members for leading in the current, having extensions adapted to engage in diagonally arranged recesses provided at the upper ends of the electrodes, and a conducting composition setting said extensions in position, and a bridge piece for connecting said members.

In witness whereof, I have hereunto signed my name.

PAUL SEJOURNET.

Copies of this patent may be obtained for five cents each, by addressing the "Commissioner of Patents, Washington, D. C."